United States Patent Office 3,657,162
Patented Apr. 18, 1972

3,657,162
PROCESS OF MAKING EXPANDABLE
POLYMERIC STYRENE PARTICLES
Arnold B. Finestone and Michal Niechwiadowicz, Leominster, Mass., assignors to Foster Grant Co., Inc., Leominster, Mass.
No Drawing. Continuation-in-part of application Ser. No. 455,614, May 14, 1965. This application Dec. 6, 1968, Ser. No. 783,175
Int. Cl. C08j 1/26
U.S. Cl. 260—2.5 B
14 Claims

ABSTRACT OF THE DISCLOSURE

A process for the manufacture of expandable plastic beads suitable for use in the production of cellular molded products by aqueous suspension polymerization in which a volatile liquid blowing agent is incorporated into the plastic beads within a short period after a polymer bead stage of 50% and before a polymer bead stage of 80% has been reached and a non-hydrocarbon inert non-condensable gas is added to the reaction chamber prior to absorption of the bulk of the blowing agent by the polymer beads.

This application is a continuation-in-part of U.S. patent application Ser. No. 455,614, filed May 14, 1965, now abandoned.

This invention relates to an improved method for the production of plastic beads by the suspension polymerization of a vinyl aromatic compound alone or in combination with an ethylenically unsaturated aliphatic compound to provide expandable plastic beads which give improved molded products having superior physical properties and, more particularly, this invention relates to an improved aqueous suspension polymerization process in which a volatile liquid blowing agent is incorporated into the plastic beads during the polymerization within a period of from two to thirty minutes after a polymer bead stage of 50% and before a polymer bead stage of 80% has been reached and adding a non-hydrocarbon inert non-consensable gas to the polymerization reaction chamber prior to absorption of the bulk of the blowing agent by the polymer beads.

The production and use of expandable plastic beads to form shaped cellular structures is well known in the art. Such beads are usually pre-expanded in steam and dried. The pre-expanded beads are blown into a mold which is then heated so that the beads expand to fill the mold. Cellular molded products formed from expandable plastic beads have good insulating properties and have found wide use in the form of containers, insulating materials, and the like.

Heretofore, it has been suggested that expandable plastic beads could be obtained by an aqueous suspension polymerization process in which a suitable blowing agent is added to the monomer charge or added to the suspension when the monomers are almost completely polymerized, such as after 90% conversion of the monomers to polymer. Processes in which the blowing agent is added to the monomers before polymerization begins require longer polymerization periods and do not produce polymers which have molecular weights high enough to give the polymers the viscosity which is required for satisfactory final molding of the beads. Another disadvantage of adding the blowing agent before polymerization begins is that blowing agents, such as aliphatic hydrocarbons, act as chain transfer agents and result in the production of polymers which have lower molecular weights. Processes in which the blowing agent is added after at least 90% conversion of monomer to polymer have not been found to provide good distribution of the blowing agent and results in the formation of hard cores in the expanded polymer beads without an extended soaking period.

It has now been discovered that the disadvantages of the prior art processes are overcome and uniform expandable polymer beads having superior molding qualities may be obtained by a two-stage aqueous suspension polymerization process. In a first polymerization stage, a monomer charge consisting of at least 55%, preferably 70% to 100%, of at least one monovinyl aromatic compound is polymerized in aqueous suspension at a temperature under 100° C. until a polymer bead stage of at least 50% and less than 80% has been reached, that is, until sufficient polymer has been formed so that at least 50% and less than 80% of the monomers have been polymerized and are in the form of beads. The first polymerization stage extends over a period of from 2 to 10 hours, depending on the catalyst used and the degree of polymerization desired. In a second polymerization stage, a volatile blowing agent, normally having a boiling point of 15° to approximately 100° C., is added to the polymerization mixture within 2 to 30 minutes, preferably 5 to 20 minutes. Polymerization is then continued by bringing the temperature of the polymerization mixture to within the range of from 95° to 145° C., preferably from 95° to 140° C., and holding the temperature within that range until polymerization is substantially complete. A temperature of over 100° C. has been found to be advantageous. The prhase "Until polymerization is substantially complete" or the like, as employed in this specification, includes polymerization to a degree somewhat less than 100%, which may be desired when using certain monomer systems. The second polymerization stage usually extends over a period of from 1 to 10 hours, depending on the catalyst used, the degree of polymerization during the first stage and the temperature of the polymerization mixture.

The first stage of the polymerization reaction is conducted in the presence of a conventional polymerization catalyst, such as benzoyl peroxide or a derivative thereof which reacts readily at a temperature under 100° C., such as para-chlorobenzoyl peroxide. The second stage of the polymerization reaction is preferably carried out in the presence of a catalyst which has a longer half-life than the first stage catalyst. However, if the temperature of the second stage is from 95° to 100° C., further amounts of benzoyl peroxide or a derivative thereof may be used as the second stage catalyst.

When the second stage of the polymerization is carried out at a temperature above 100° C., a second stage catalyst is used which has a substantially longer half-life than benzoyl peroxide, which is 0.4 hour at 100° C. in benzene. Although the second stage catalyst may be present during the first stage and function effectively in the second stage, it may in some instances be present and not perform a substantial catalytic role in the second stage reaction because of decomposition during the first stage reaction. Therefore, the second stage catalyst is preferably added at the beginning of the second stage. When the second stage catalyst is added at the beginning of the second stage, it is preferably added as a solution in the blowing agent if it is sufficiently soluble therein. If the second stage catalyst is insoluble or only slightly soluble in the blowing agent, it may be added as an aqueous slurry. If the catalyst is to be added at the beginning of polymerization or prior to the second stage reaction, it should have a half-life of more than one hour, preferably more than three hours at 100° C. in benzene. A catalyst of this type will not undergo substantial decomposition at a temperature of from 80° to 100° C., but will exercise its catalytic effect at the higher temperature of the second stage polymerization reaction. Suitable second stage polymerization catalysts include tertiary butyl perbenzoate, tertiary butyl peracetate, and cyclohexanone peroxide.

The addition of the blowing agent to the reaction mixture after a bead stage of 50% and before a bead stage of 80% has been reached, which is after completion of the first stage, and the rapid addition of the volatile liquid blowing agent during the second stage within a period of 2 to 30 minutes has a number of advantages. Since the blowing agent is not added to the polymerization mixture in this modification until a bead stage of at least 50% has been reached, the polymerization reaction during the first stage is not affected by the chain transfer action of the blowing agent. However, good distribution of the blowing agent throughout the polymer beads is obtained because the blowing agent is added before a bead stage of 80% has been reached, preferably after a bead stage of from 60 to 75% has been reached, and readily diffuses evenly throughout the polymer particles by the end of the second stage. Even diffusion of the blowing agent throughout the polymer particles results in molded articles of uniform density and a substantial absence of hard cores in the expanded beads. In addition, the molecular weight and viscosity of the polymer may be controlled by the process of this invention so that the molding properties of the expandable beads and properties of the articles molded from the polymer beads are superior. Still further advantages are the shortened period of impregnation with the blowing agent and shortened polymerization cycle. This obviates the lengthy and dangerous soaking periods which are required when the blowing agent is added gradually over extended periods of time at low temperatures, as has been the practice heretofore.

Normally, the first stage of the reaction is conducted at atmospheric pressure, although pressures from 3 to 50 p.s.i.g. can be used; however, the reactor is pressurized during the second stage of the polymerization reaction by the introduction into the reactor of a non-hydrocarbon chemically inert and non-condensable gas just prior to the addition of the bulk of the blowing agent or at any time from immediately after the addition of the blowing agent and before the bulk of the blowing agent has been absored by the polymer beads. The pressure of the inert and non-condensable gas acts to suppress refluxing in the reactor and thus reduces the porosity of the polymer particles. An amount of pressurizing gas is introduced which is sufficient to increase the pressure in the reactor by about 3 to 50 p.s.i.g., preferably 5 to 25 p.s.i.g. Any gas or mixture of gases can be used which is chemically inert and substantially non-condensable under the conditions in the reactor, such as nitrogen or argon, or mixtures of nitrogen and argon. The preferred gas is nitrogen. The pressure in the reactor, which is provided by the inert and non-condensable gas, prevents the blowing agent from leaving the polymer beads and, therefore, prevents undesirable porosity in the polymer beads.

The monovinyl aromatic compound is preferably styrene although vinyl naphthalenes, vinyl aryl compounds and their substituted products may also be used. Example of substituted vinyl aryl compounds are halogenated styrenes, such as mono- and dichloro-, mono- and dibromostyrene, and fluoro-styrene; and alkyl, alkenyl, aryl, arylalkyl, alkylaryl and ring substituted styrenes such as monoand dimethyl styrenes, and ethylstyrene. A combination of monovinyl aromatic compounds may also be used. The ethylenically unsaturated compound which is copolymerizable with the monovinyl aromatic compound may be an ester of acrylic acid, methacrylic acid, or itaconic acid, such as ethylacrylate, or ethylitaconate, or methylmethacrylate, or other alkyl esters of these acids; or nitrile derivatives of acrylic acid or methacrylic acid, such as acrylonitrile or methacrylonitrile.

The polymerization process is initiated by dispersing the monomer in water and bringing the temperature of the dispersion to a temperature under 100° C., preferably to a temperature within the range of from 70° to 95° C. Polyvinyl alcohol is the preferred suspending agent, although other conventional suspending agents may be used, such as tricalcium phosphate or other difficultly soluble phosphates, calcium carbonate, carboxymethyl cellulose, hydroxyethyl cellulose, polyvinylpyrrolidone, polyvinyl alcohol, aluminum oxide, or magnesium silicate. It is preferred to delay addition of the suspending agent until about 20 to 55% of the monomeric content has been polymerized, which normally will be about 1½ to 5 hours after the suspension reaches the desired polymerization temperature for the first stage. The pH of the suspension may be varied depending on the suspending agent used. A pH of 6 or higher is used when the suspending agent is tricalcium phosphate.

Volatile liquid blowing agents which have boiling points of from about 15° to about 100° C. are suitable for use in the process of this invention. Petroleum ethers are preferred. The petroleum ether, which is known as the pentane fraction, is especially suitable. The pentane fraction boils within the range of from 35° to 65° C. and contains at least 90% of normal pentane. The hexane fraction which boils within the range of from 65° to 72° C., and the heptane fraction which boils within the range of from 95° to 100° C., may also be used. Other suitable blowing agents include pure hydrocarbons which boil within the range of from 15° to 100° C. These include cyclic aliphatic hydrocarbons, such as cyclopentane and cyclohexane, halogenated aliphatic hydrocarbons, such as dichlorofluoromethane, and lower aliphatic alcohols, such as methanol and ethanol.

About 3 to 10%, preferably 4 to 8%, by weight of the volatile blowing agent is present in the finished expandable beads. This amount of blowing agent is sufficient to cause the degree of expansion required in the customary molding procedures. There is generally little loss of blowing agent during the polymerization process so that the amount of blowing agent added to the polymerization mixture is about 3 to 10% by weight of the monomeric content of the polymerization mixture.

If desired, the monomers can be polymerized in the presence of various substances, such as dyes, plasticizers, and the like which are then present in the expandable beads and molded articles made therefrom.

After completion of the polymerization, the polymerization mixture is cooled in the reactor in order to prevent premature expansion of the expandable particles when they are discharged from the reactor. The beads may then be removed from the polymerization mixture, washed, and dried by the use of conventional processing techniques.

The following examples, in which all parts are by weight, illustrate the invention.

EXAMPLE 1

A polymerization mixture consisting of 51 parts of styrene monomer which contained 0.2% by weight of benzoyl peroxide, based on the styrene, was added to 49 parts of water which had been adjusted to a pH of 3.3 by the addition of phosphoric acid. The reaction vessel was a jacketed kettle equipped with a sealable cover, agitator, thermometer, and inlet port. The temperature of the polymerization mixture was brought to 90° C. and held at that temperature for three hours at atmospheric pressure and with agitation. Polyvinyl alcohol in an amount of 0.018%, based on the total charge in the vessel, was then added. Approximately forty minutes later, 0.006% of polyvinyl alcohol, based on the total charge in the vessel, was added. In both instances, the polyvinyl alcohol was added in the form of a 5% aqueous solution. When about 67% of the monomer had been converted to polymer, the reaction vessel was sealed and pressurized to 15 p.s.i.g. with nitrogen. Blowing agent in the form of commercial pentane having a boiling range of 36° to 40° C. in an amount of 7.5%, based on the weight of both the monomer and the blowing agent charge, was introduced into the reaction vessel during a period of about eight minutes. The blowing agent contained 0.08% by weight of tertiary-butyl peracetate, based on the weight of the oil phase, i.e. the monomer plus the pentane. During addition of the blowing agent, the pressure in the reaction vessel rose to 62 p.s.i.g. but after all of the blowing agent had been added, the pressure readily decreased and became stable at 38 p.s.i.g. within 25 minutes. The rapid reduction in pressure indicated that the blowing agent had been dissolved in the unreacted monomer since the vapor pressure of a solution of styrene and the blowing agent is lower than that of the blowing agent itself. The reaction temperature was raised to 120° C. 1½ hours after adding the blowing agent and polymerization was continued for another 5 hours. At the end of this time, the contents of the reaction vessel were cooled and the beads were separated, washed and dried. Over 96% of the product passed through U.S. Sieve No. 10 and was retained in U.S. Sieve No. 30. The beads were preexpanded by exposure to steam. The pre-expanded beads had fine cell sizes, no hard cores and molded well.

EXAMPLE 2

Fifty-one parts of a monomer mixture, which was two-thirds styrene and one-third methyl methacrylate, by weight, and contained 0.40% by weight of benzoyl peroxide, based on the total weight of the monomers, were added to a reaction vessel of the type used in Example 1 which contained 49 parts of water which had been adjusted to a pH of 3.5 with phosphoric acid. The temperature of the polymerization mixture was raised to 80° C. and held at that temperature with agitation for three hours. Polyvinyl alcohol in an amount of 0.018%, based on the total charge in the reactor, was added. Approximately ½ hour later, 0.006% of polyvinyl alcohol, based on the total charge in the reactor, was added. In both instances, the polyvinyl alcohol was added in the form of a 5% aqueous solution. After about 63% of the monomer mixture had been converted to polymer, the reaction vessel was sealed, pressurized to 15 p.s.i.g. with nitrogen, and 7.5% by weight of commercial pentane together with 0.08% by weight of t-butyl peracetate, both based on the weight of the oil phase (i.e. monomer mixture plus pentane) were introduced into the reaction vessel within a period of about six minutes. During addition of the pentane, the pressure in the reaction vessel rose to 54 p.s.i.g., but after all of the pentane had been added, the pressure swiftly decreased and within 25 minutes levelled out at 33 p.s.i.g. Two hours after the pentane had been added, the temperature of the polymerization mixture was raised to 120° C. and held at that temperature for three hours. The contents of the reaction vessel were then cooled, and the beads were separated, washed and dried. Over 95% of the product passed through U.S. Sieve No. 10 and was retained on U.S. Sieve No. 30. The beads were pre-expanded by exposure to steam and the preexpanded beads had fine cell sizes, were free from hard cores and molded well.

EXAMPLE 3

Example 1 was repeated, except that 2.7% of the styrene was replaced with tris (2,3-dibromopropyl) phosphate. Molded articles prepared by the use of the beads of this example are self-extinguishing.

EXAMPLE 4

A monomer mixture in an amount of 51 parts, which consisted of 62% styrene, 23% acrylonitrile and 15% alpha-methylstyrene, by weight, was added to a reaction vessel, such as that used in Example 1, containing 49 parts of water which had been adjusted to a pH of 3.5 by the addition of phosphoric acid. The monomer mixture contained 0.8% by weight of lauroyl peroxide and 0.3% by weight of di-t-butyl-p-cresol, based on the total weight of the monomer mixture. The temperature of the polymerization mixture was brought to 70° C. and held at that temperature at atmospheric pressure with agitation. After two hours, polyvinyl alcohol in an amount of 0.018%, based on the total contents of the reactor, was added. One-half hour later, 0.006% of polyvinyl alcohol, based on the total contents of the reactor, was added. The polyvinyl alcohol was added in both instances in the form of a 5% aqueous solution. After about 73% of the monomer mixture had been converted to polymer, the reaction vessel was sealed, pressurized with nitrogen to 5 p.s.i.g. Then 7.5% of commercial pentane and 0.125% of t-butyl peroxy isobutyrate, based on the weight of the monomer mixture and pentane, were added to the reaction vessel within a period of about six minutes. The second polymerization stage was carried out by bringing the temperature of the reaction mixture to 95° C. and holding it at that temperature for about five hours. The beads were removed from the cooled polymerization mixture, washed and dried. The dried beads were pre-expanded by exposure to steam. The pre-expanded beads had fine cell sizes, were free from hard cores and molded well.

EXAMPLE 5

Example 1 was repeated except that 2.4% of styrene was replaced with brominated low molecular weight polybutadiene. The pre-expanded beads had fine cell sizes, were free from hard cores and molded well. The molded articles were self-extinguishing.

EXAMPLE 6

Example 2 was repeated except that the initial monomer mixture contained 55% styrene, 38% methylmethacrylate and 7% dimethylitaconate, by weight. The pre-expanded beads were free from hard cores and molded easily.

EXAMPLE 7

Example 2 was repeated except that the initial monomer mixture contained 77% styrene, 23% acrylonitrile, 0.15% dodecyl mercaptan, 0.5% lauroyl peroxide, and 0.3% di-t-octyl-p-cresol, by weight. The pre-expanded beads had fine cell sizes, were free from hard cores and molded well.

EXAMPLE 8

Example 1 was repeated except that the initial monomer mixture was a solution consisting of 93.75% styrene, 6% SBR, 0.2% benzoyl peroxide and 0.05% n-dodecyl mercaptan, by weight. The pre-expanded beads possessed particularly fine and uniform cells and molded well.

EXAMPLE 9

Example 1 was repeated except that the initial monomer mixture contained 0.01% of divinyl benzene and 0.2% of benzoyl peroxide, by weight. The pre-expanded polymer particles had fine cell sizes and molded well.

COMPARATIVE EXAMPLE A

A polymerization reaction was made according to Example 1, except that the blowing agent containing t-butylperacetate was added after a bead stage of about 93% had been reached. The pressure in the reaction vessel did not fall below 62 p.s.i.g. during a period of 20 minutes after pressurization, but after 1½ hours the pressure had dropped to 51 p.s.i.g. The second polymerization stage was carried out at 120° C. for about five hours. The pre-expanded beads had hard cores in the larger beads.

The results of this example show that adding the blowing agent after a bead stage of greater than 80% had been reached results in the production of an unsatisfactory product.

COMPARATIVE EXAMPLE B

Example 1 was repeated except that the mixture of the blowing agent and t-butyl peracetate was added over a period of 68 minutes. The pre-expanded beads showed crystallinity, had large and non-uniform cells, and many of the large beads had hard cores.

The results of this example show the addition of the blowing agent over a period of time substantially longer than that of this invention results in the production of a unsatisfactory product.

COMPARATIVE EXAMPLE C

Example 1 was repeated except that the reactor was not pressurized above atmospheric pressure with a non-hydrocarbon inert non-condensable gas prior to the addition of the blowing agent and t-butyl peracetate mixture or thereafter. At the end of the addition of the blowing agent, the pressure in the reactor was 49 p.s.i.g. and rapidly decreased to 32 p.s.i.g. There were many lumps produced when the beads were pre-expanded. The lumps consisted of beads fused together.

The results of this example show that if the reactor is not pressurized according to this invention, an unsatisfactory product is produced.

While the invention has been described with reference to particular embodiments thereof, it will be understood that various modifications can be made to the present invention without departing from the spirit and scope thereof, which is to be limited only by the appended claims.

What is claimed is:

1. A two-stage suspension polymerization process for preparing expandable plastic particles by the polymerization of a monomer charge comprising at least 55% monovinyl aromatic monomer compound, said process comprising conducting the polymerization in the presence of a first stage catalyst selected from the class consisting of benzoyl peroxide and derivatives thereof and a second stage catalyst having a half-life greater than the half-life of the first stage catalyst, maintaining the temperature during the first polymerization stage below 100° C. the second polymerization stage beginning after at least about 50% of said monomer charge has been converted to polymer and before about 80% of said monomer charge has been converted to polymer; adding in the beginning of said second polymerization stage during which about 50% to about 80% of said monomer charge is being converted to polymer a substantially saturated aliphatic volatile liquid blowing agent having a boiling temperature of from 15 to 100° C. to the polymerization mixture in a period of from about 2 to about 30 minutes which period is substantially during the time in which about 50% to about 80% of said monomer charge is being converted to polymer; adding prior to absorption of the bulk of the volatile liquid blowing agent by the polymer particles a non-hydrocarbon inert non-condensable gas to the polymerization mixture to increase the pressure in the reactor in an amount from about 3 to about 50 p.s.i.g., raising the temperature of the polymerization mixture to at least 95° C.; and completing the polymerization.

2. A process according to claim 1, wherein the monovinyl aromatic compound is styrene, and the substantially saturated aliphatic volatile liquid blowing agent boils in the range of 35° to 65° C.

3. A process according to claim 1, wherein the monomer charge is polymerized in the first polymerization stage until a polymer bead stage of from 60 to 75% has been reached prior to addition of the substantially saturated aliphatic volatile liquid blowing agent, and the temperature of the polymerization mixture is raised to within the range of from 90° C. to 145° C. during the second polymerization stage.

4. A process according to claim 1, wherein the substantially saturated aliphatic volatile liquid blowing agent is pentane and the non-hydrocarbon inert non-condensable gas is nitrogen.

5. A process according to claim 1, wherein the second stage catalyst has a half-life value of greater than 1 hour at 100° C. in benzene.

6. In a two-stage suspension polymerization process of forming expandable plastic particles by polymerizing a monomer charge containing at least 55% to 100% of a monovinyl aromatic monomer compound said process comprising conducting the polymerization in a first polymerization stage in the presence of a catalyst selected from the class consisting of benzoyl peroxide and derivatives thereof at a polymerization temperature of less than 100° C., the second polymerization stage beginning after at least about 50% of said monomer charge has been converted to polymer and before about 80% of said monomer charge has been converted to polymer; adding concurrently in the beginning of said second polymerization stage during which about 50% to about 80% of said monomer charge is being converted to polymer in a period of from 2 to 30 minutes a second stage catalyst having a half-life greater than the half-life of benzoyl peroxide and 3 to 10% by weight, based on the monomer charge, of a substantially saturated aliphatic volatile liquid blowing agent having a boiling temperature of from 15° to 100° C., said period of addition is substantially during the time in which about 50% to about 80% of said monomer charge is being converted to polymer; adding a non-hydrocarbon inert non-condensable gas to the polymerization mixture prior to absorption of the bulk of the volatile liquid blowing agent by the polymer particles in an amount to increase the pressure in the reactor by from about 3 to 50 p.s.i.g.; raising the temperature of the polymerization mixture to 95° to 145° C.; and completing the polymerization.

7. A process according to claim 6, wherein 4 to 8% by weight, based on the monomer content, of a pentane fraction boiling at 35° to 65° C. is added to the polymerization mixture.

8. A process according to claim 6 wherein the monomers comprise 55% to 100% of a monovinyl aromatic compound and up to 45% of at least one normally liquid ethylenically unsaturated compound copolymerizable with the monovinyl aromatic compound.

9. A process according to claim 6 wherein the first polymerization stage is conducted at a temperature within the range of from 70° to 95° C. until a polymer bead stage of from 60% to 75% has been reached thereafter, in the second polymerization stage, adding the second stage catalyst and the substantially saturated aliphatic volatile liquid blowing agent and bringing the temperature of the polymerization mixture to within the range of from 95° C. to 140° C.

10. A process according to claim 6, wherein the substantially saturated aliphatic volatile liquid blowing agent is pentane and the non-hydrocarbon inert non-condensable gas is nitrogen.

11. A process according to claim 6, wherein the suspending agent is added to the aqueous polymerization mixture after a polymer bead stage of 60 to 75% has been reached.

12. A process according to claim 6, wherein the monovinyl aromatic compound is styrene.

13. A process according to claim 6, wherein the second stage catalyst has a half-life value of greater than 1 hour at 100° C. in benzene.

14. A process according to claim 6, wherein the second stage catalyst is added in admixture with the volatile liquid blowing agent.

References Cited

UNITED STATES PATENTS 3,192,169  6/1965  Doak _____ 260—2.5 B
3,265,643  8/1966  Hatano et al. _____ 260—2.5 B

FOREIGN PATENTS 648,135    5/1963  Belgium _____ 260—2.5 B
1,152,261  8/1963  Germany _____ 260—2.5 B MURRAY TILLMAN, Primary Examiner M. FOELAK, Assistant Examiner U.S. Cl. X.R.

260—93.5 W